United States Patent [19]
Finlayson

[11] Patent Number: 6,043,792
[45] Date of Patent: Mar. 28, 2000

[54] SINGLE ANTENNA ARRANGEMENT PROVIDING INTERROGATION FIELD

[75] Inventor: John Douglas Finlayson, Brisbane, Australia

[73] Assignee: Alfa Laval Agri AB, Tumba, Sweden

[21] Appl. No.: 08/722,075

[22] PCT Filed: Apr. 18, 1995

[86] PCT No.: PCT/AU95/00218

§ 371 Date: Oct. 18, 1996

§ 102(e) Date: Oct. 18, 1996

[87] PCT Pub. No.: WO95/28748

PCT Pub. Date: Oct. 26, 1995

[30] Foreign Application Priority Data

Apr. 18, 1994 [AU] Australia ................................ PM 5125
Jul. 27, 1994 [AU] Australia ................................ PM 7087

[51] Int. Cl.⁷ ..................................................... H01Q 21/00
[52] U.S. Cl. .......................... 343/867; 343/866; 343/742; 340/572
[58] Field of Search ..................................... 343/867, 866, 343/741, 742; 340/572; H01Q 21/00

[56] References Cited

U.S. PATENT DOCUMENTS

| 1,958,886 | 5/1934 | Chubb | 343/867 |
| 4,135,183 | 1/1979 | Heltemes | 340/572 |
| 4,527,152 | 7/1985 | Scarr et al. | 340/572 |
| 4,972,198 | 11/1990 | Feltz et al. | 343/867 |

FOREIGN PATENT DOCUMENTS

| 0 496 609 A1 | 7/1992 | European Pat. Off. . |
| 0 622 766 A1 | 11/1994 | European Pat. Off. . |
| WO 86/02186 | 4/1986 | WIPO . |

*Primary Examiner*—Hoanganh Le
*Attorney, Agent, or Firm*—Hovey, Williams, Timmons & Collins

[57] ABSTRACT

An antenna arrangement includes a passageway having at least one side and an antenna located in a substantially vertical plane of the side. The antenna has one or more coils, each having a corner and adjacent straight portions oriented at an acute angle to a floor surface of the passageway. The acute angle is preferably 30° to floor surface.

24 Claims, 3 Drawing Sheets

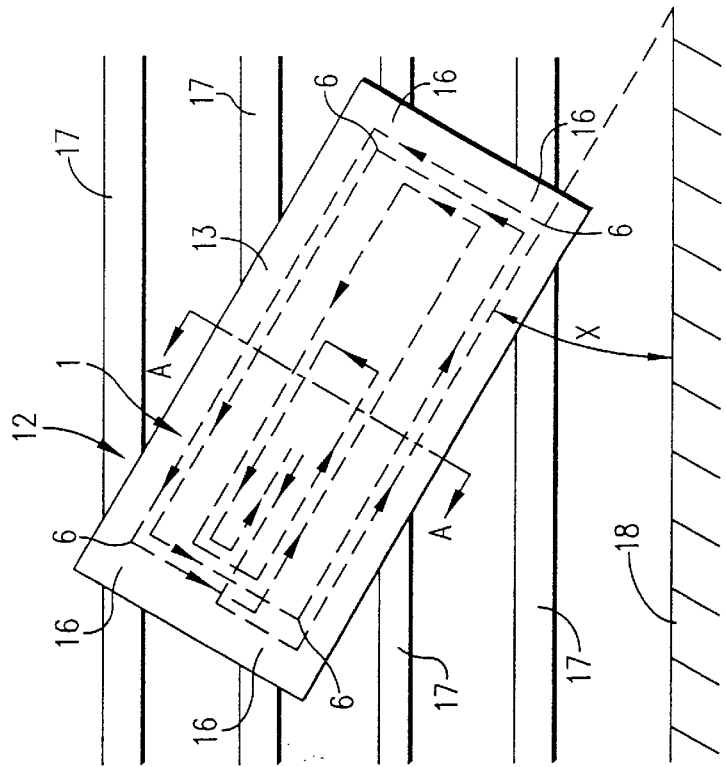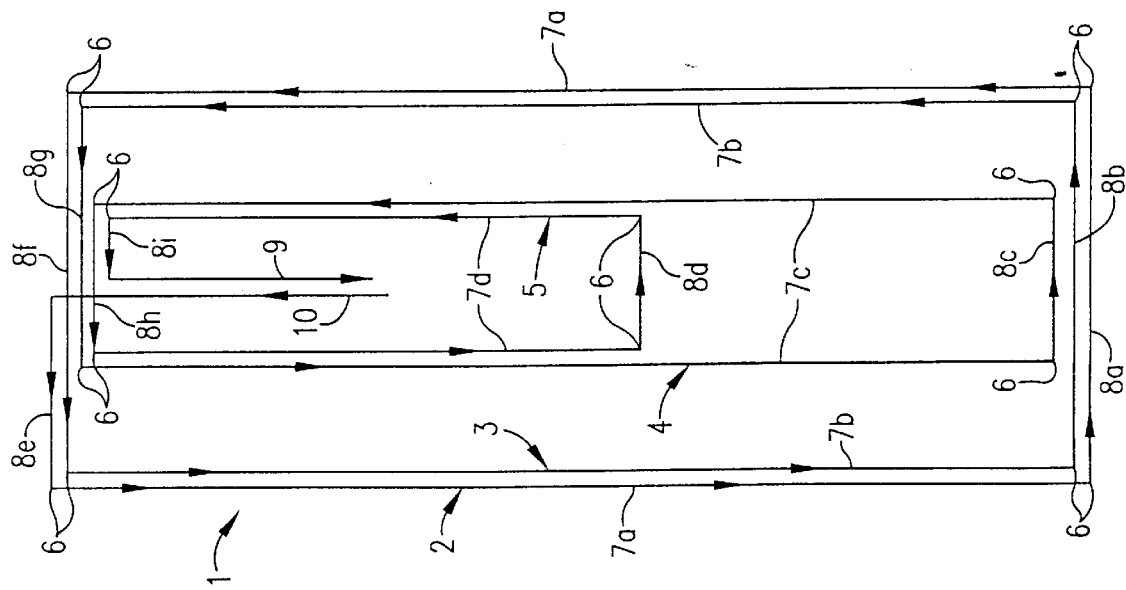

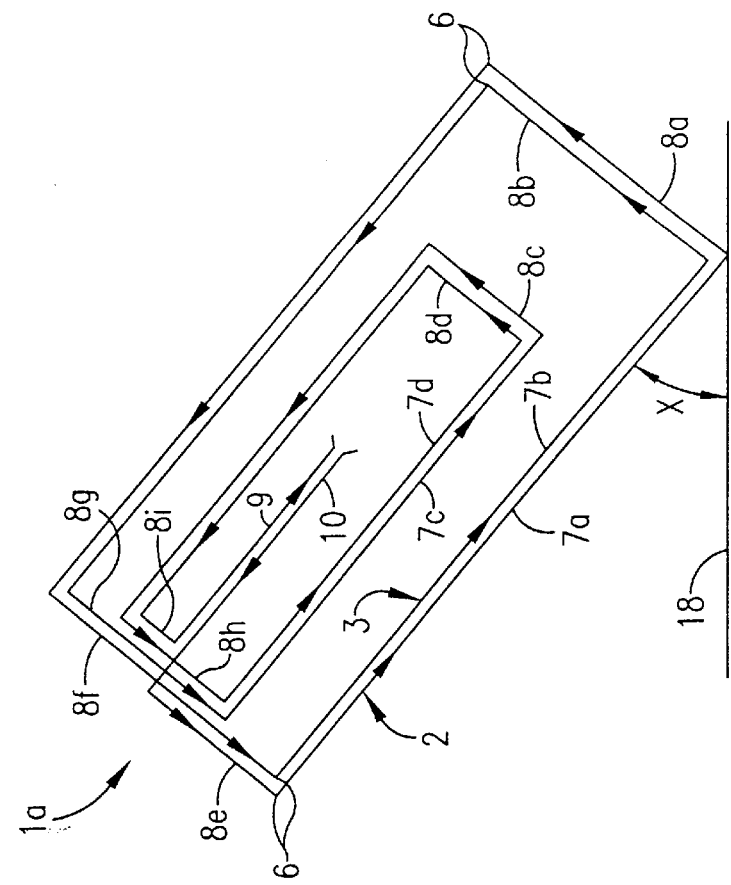
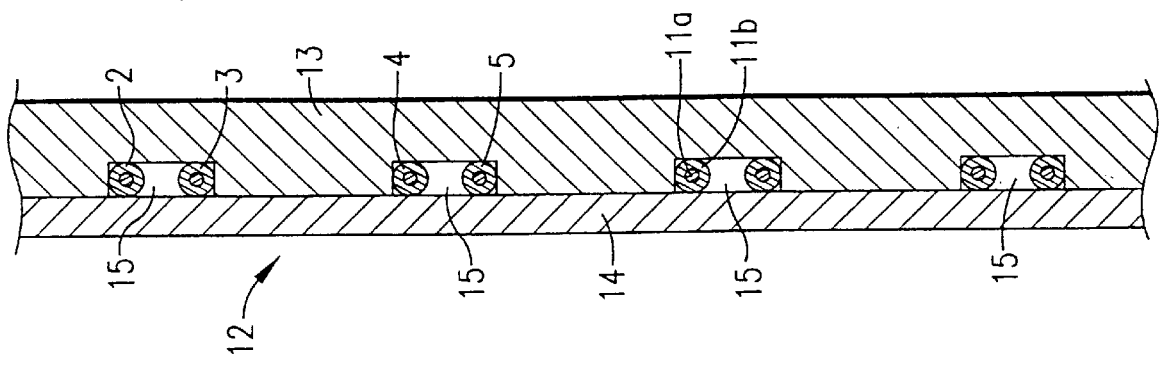

SINGLE ANTENNA ARRANGEMENT PROVIDING INTERROGATION FIELD

FIELD OF THE INVENTION

THIS INVENTION relates to an antenna arrangement and particularly, but not necessarily limited to, an antenna arrangement for transmitting a signal for energising an identification transponder and receiving a coded signal transmitted from the energised transponder. Although the invention will be described with reference to animal identification, it is to be understood that it may be possible to use the invention for other applications.

BACKGROUND OF THE INVENTION

Identification transponders are often used to monitor or identify animals such as cattle and other ruminants. Identification transponders are generally either attached to the ear or reside inside the animal's digestive system (ie. in the reticulum or rumen). When an identification transponder is within the influence of a sufficiently transmitted field strength, having a specific frequency range, it becomes energised and transmits a coded signal. The signal is either received by the antenna providing the field or by another suitably positioned receiving antenna. This signal identifies the animal which may then be weighed for monitoring purposes.

One type of antenna arrangement uses a hand held antenna which is moved towards an animal to eners and receive a coded signal from an identification transponder associated with the animal. This is a labour intensive task as it requires a person to manoeuvre the antenna into suitable positions. Further, this can be impractical or dangerous when used in passageways such as cattle runs in which animals may jump or bolt.

Stationary antenna arrangements have also been developed and include antennas positioned on one or both sides of a passageway and may also include an antenna positioned across the passageway.

Disclosed in U.S. Pat. No. 3,493,955 is a stationary antenna arrangement comprising a transmitter antenna and a receiver antenna positioned on opposite sides of a passageway. A further antenna is positioned under the floor and is positioned across the passageway.

U.S. Pat. No. 3,838,409 discloses a stationary antenna arrangement including three stationary antennas, two being positioned on opposite sides of a passageway and the third forming a frame around a section of the passageway. The antennas positioned on opposite sides of the passageway are electrically connected to both a first output of a transmitter and an input of a first detector. The third antenna is electrically connected to a second output of the transmitter which provides a signal out of phase with the first output. The third antenna is also connected to an input of a second detector. This arrangement minimises the effects of regions of minimal electromagnetic field intensity.

In U.S. Pat. No. 4,963,880 there is disclosed an antenna arrangement including a stationary single coil co-planar antenna typically 10 inches in diameter. The antenna is electrically connected to transmitting and receiving circuitry in which the antenna alternates from transmit mode to receive mode. U.S. Pat. No. 5,274,392 discloses a stationary antenna arrangement including a stationary antenna disposed around a conveyor belt in a plane at an acute angle to both the horizontal and the longitudinal axis of the conveyor belt. In U.S. Pat. No. 4,527,152 there is disclosed a system comprising two opposing rectangular antennas inclined at 25° to the horizontal. However, the antennas can provide an interrogation field(s) with a "nulled" or reduced field strength region due to opposing fields from each antenna being transmitted into the interrogation region. There are many other patents disclosing stationary antenna arrangements which include U.S. Pat. No. 3,500,373, U.S. Pat. No. 4,845,509, U.S. Pat. No. 4,633,250 and U.S. Pat. No. 5,142,292.

One problem with the stationary antenna arrangements disclosed in the above U.S. patents is that they are neither specifically designed nor ideally suited for applications such as animal identification or other applications in which the position of the transponder may vary significantly in orientation, height, distance from a passageway side or speed through the passageway. All of these variables may exist in animal identification due to the size of the animal, location of the transponder and speed of the animal (which may bolt past the antenna arrangement). A further problem is due to Government regulations restricting the amount of power that may be transmitted.

The above problems in combination with the shape of the field patterns provided by the antenna or antennas has the disadvantage of the transmitted field not always being sufficient to energise an animal identification transponder and receive a coded signal therefrom. Accordingly, animals may have to be held stationary, reversed or manoeuvred in relation to the antenna arrangement and when a single antenna is used then the animal may have to be pushed towards the antenna. The above solutions are both labour intensive and physically demanding.

SUMMARY OF THE INVENTION

It is an object of this invention to overcome or alleviate at least one of the problems associated with prior art antennas used for energising identification transponders.

According to one aspect of the invention there is provided an antenna arrangement including:

(i) a passageway having one or more sides; and
(ii) an antenna located in a substantially vertical plane of one of said sides, and said antenna including at least one coil having at least one corner and an adjacent straight portion which is oriented at an acute angle to a floor surface of the passageway, wherein said antenna is arranged to provide an interrogation field across said passageway, said interrogation field being provided solely by said antenna.

Preferably, the antenna includes a plurality of coils which are each positioned in the same vertical plane, such an antenna is known in the art as a "co-planar antenna". Suitably, the vertical plane is parallel to a longitudinal axis of the passageway.

Preferably, said floor surface is planar.

Suitably, said floor surface has a plane substantially orthogonal to the vertical plane. The floor surface may be a ground surface or a raised floor associated with the passageway.

Preferably, the acute angle is between 15° and 60° to said floor surface and more preferably between 20° and 40°. However, most preferably the acute angle is substantially 30° to said floor surface.

Preferably, each of said coils may have corners and straight portions.

One or more of said coils may be substantially parallelogram shaped. The corners may be at any suitable angle. Preferably the corners are right angle corners. Preferably, said parallelogram forms a rectangle or rhombus or diamond shaped quadrilateral.

The antenna may include at least one inner coil and at least two outer coils. Suitably, at least one straight portion forming a side of the inner coil and a corresponding straight portion forming a side of an outer coil are widely spaced relative to at least one other corresponding side pair comprising a side of the inner coil and side of the outer coil.

Suitably, there are two outer coils. It is preferred that corresponding sides of each outer coil are closely adjacent to each other.

Preferably, each said coil is wound in the same direction. The antenna may be wound from a single length of wire.

Suitably, the majority of each of said corners may be at a different distance from said floor surface. Preferably, each of said corners are at a different distance from said floor surface.

Preferably, said antenna is attached to a support having low thermal conductivity. Suitably, said support may be moulded around said antenna. However, preferably, said support is formed from two portions with said antenna sandwiched therebetween. One of said portions may have channels therein for accommodating said antenna. The support means may have thermal insulation properties. It may also have sufficient strength to thereby provide protection on the antenna. Suitably, said support means is made from wood, fibreglass or plastics material.

The antenna in use may be self supporting or suitably positioned by being mounted to an upright structure or surface. Preferably, said upright structure is a fence associated with said passageway.

Suitably, said antenna is electrically connected to an electronic means including:

a transmitter means adapted to supply an altering signal to said antenna, wherein, said antenna and said transmitter form a circuit which is at or near resonance when said frequency is within said signal is applied thereto; and a receiver adapted to receive and decode signals received from said antenna.

BRIEF DESCRIPTION OF THE DRAWINGS

In order that the invention may be readily understood and put into practical effect reference will now be made to preferred embodiments illustrated in the accompanying drawings in which:

FIG. 1 is a first embodiment of an antenna arrangement;

FIG. 2 illustrates the antenna of FIG. 1 when mounted on rails of a cattle run;

FIG. 3 is a cross sectional view through A—A of FIG. 2;

FIG. 4 is a second embodiment of an antenna arrangement;

Referring to FIG. 1 there is illustrated an antenna arrangement including an antenna 1 having two outer coils 2 and 3 and two inner coils 4 and 5 all aligned in a common plane (ie. so-planar). Antenna 1 is wound from a single length of wire in which each coil 2, 3, 4 and 5 is wound in the same direction as illustrated by direction arrows.

Figure 6:
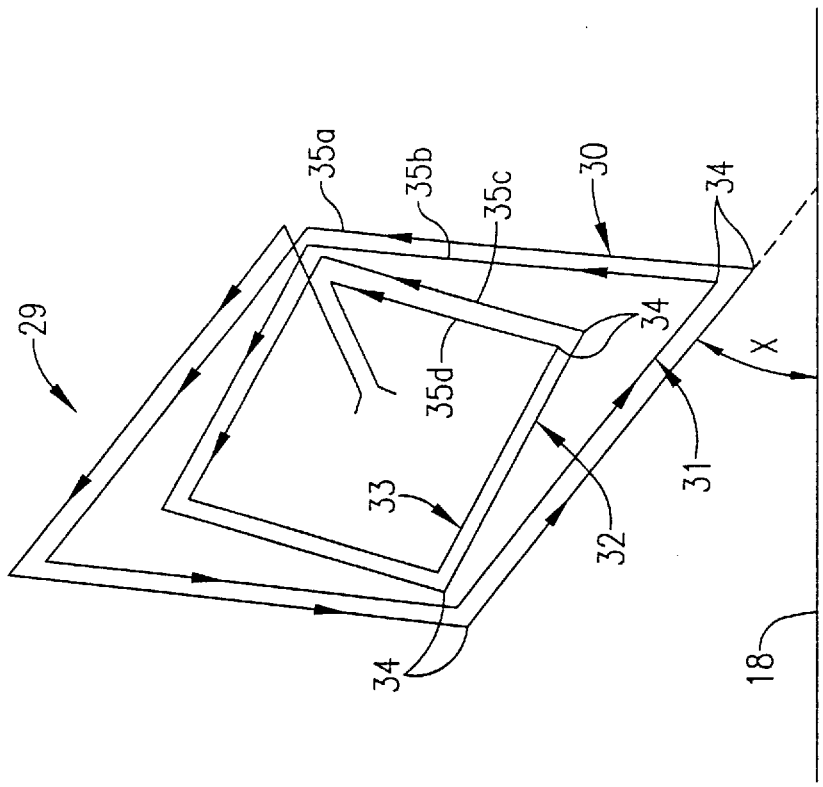
FIG. 6 is a further embodiment of an antenna arrangement.

Each coil 2, 3, 4 and 5 comprises right angle corners 6, a respective longitudinal straight portion 7a to 7d, a respective lowermost transverse straight portion 8a to 8d and a respective uppermost transverse straight portion 8e to 8i.

Accordingly, each coil 2, 3, 4 and is substantially rectangular in shape each side of which is formed by a straight portion.

Longitudinal straight portions 7a and 7b located at the same sides of antenna 1 are near or adjacent each other and are also substantially parallel to each other. Longitudinal straight portions 7a and 7b are spaced away from longitudinal straight portions 7c and 7d. Lowermost transverse straight portion 8c is located near or substantially adjacent lowermost transverse straight, portions 8a and 8b. Lowermost transverse portion 8d is spaced away from lowermost transverse straight portion 8c.

Connecting wires 9 and 10 are bound together (not shown for clarity) by heat shrinkable plastics film and are formed from the single length of wire forming antenna 1.

Referring to FIGS. 2 and 3 antenna 1 is shown when attached to a support 12 which is made from two sheets of material 13 and 14 having thermal insulation properties. Both sheets 13 and 14 in this embodiment are made of pine timber each having a thickness of approximately 18 mm. Sheet 13 has channels 15 cut therein to accommodate coils 2, 3, 4 and 5 which are positioned in a common plane, and are adhered to walls of channels 15 by hot wax. The wire used for coils 2, 3, 4 and 5 preferably has a multi-strand conductive core 11a covered by electrical insulation 11b. Sheets 13 and 14 are secured together by a fibreglass resin and the complete support 12 is sealed by fibreglass. Alternatively, sheet 13 may be disregarded and coils 2, 3, 4 and 5 covered with fibreglass filler and one or more fibreglass sheets.

Before sealing support 12 with fibreglass, fixing apertures 16 are drilled therein. After sealing, bolts can then be inserted through fixing apertures 16 for attaching support member 12 to fence rails 17 of a passageway such as a cattle run. Support member 12 is attached to rails 17 such that the common plane of antenna 1 is aligned vertically adjacent the cattle run and the plane is also substantially parallel to the longitudinal axis of the cattle run.

Antenna 1 is outlined in phantom, and as illustrated straight portions 7a to 7d are at an acute angle x to a floor surface 18 which is typically a ground surface orthogonal to the vertical plane of antenna 1. This acute angle may vary between 15° to 60°, however, using this specific antenna 1 it is desirable that the acute angle is between 20° to 40° and preferably substantially 30°.

When antenna 1 is mounted within the above ranges the majority of corners 6 are at different distances from ground surface 18. At certain angles such as 30° each corner 6 may be at a different distance from ground surface 18. Further, when mounted a lowermost corner 6 is approximately at a height of 32 cm from ground surface 18 and an uppermost corner 6 is at a height of 157 cm from ground surface 18. This provides the lowermost corner 6 to be approximately aligned with a transponder in the stomach of a small ruminant, whereas the uppermost corner 6 provides for alignment with a transponder attached to an ear of a large bull.

Accordingly, antenna 1 including a combination of straight portions 7a to 7d, 8a to 8h and associated corners 6 may be used to energise and interrogate a transponder residing in or attached to animal in which the problems associated with animal size and position of the transponder are reduced.

In FIG. 4 a second embodiment of the invention including antenna 1a is shown. This antenna is similar to the antenna of FIG. 1. the difference being that lowermost transverse straight portions 8c and 8d are located near or substantially adjacent each other and are spaced away from lowermost transverse straight portions 8a and 8b.

Figure 5:
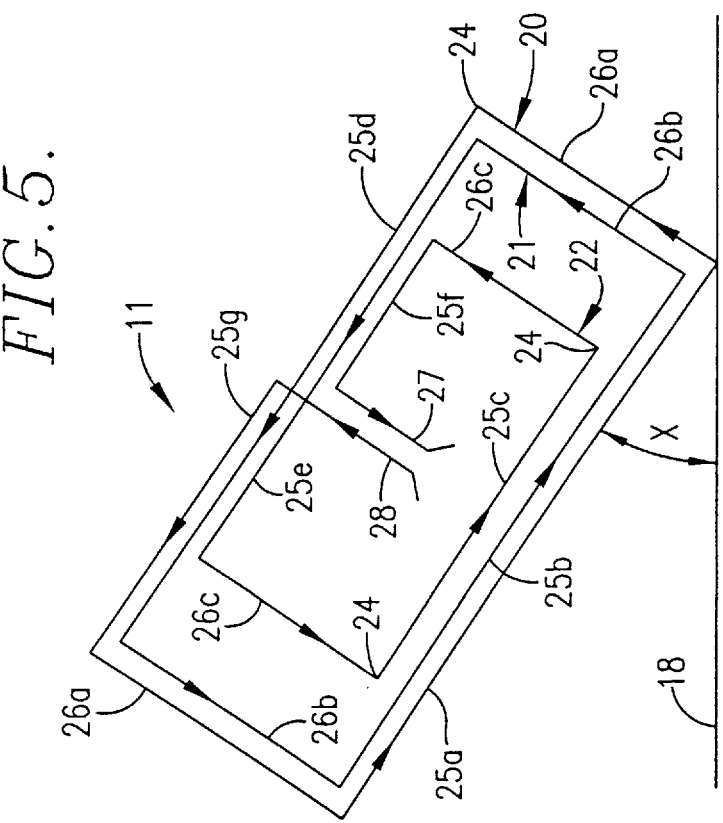
FIG. 5 is a third embodiment of an antenna arrangement.

Referring to FIG. 5 there is illustrated another embodiment of the invention including antenna 11 having two outer coils 20 and 21 and an inner coil 22 all aligned in a common plane.

Each coil 20 to 22 comprises right angle corners 24, lowermost longitudinal straight portions 25a to 26c, uppermost longitudinal straight portions 25d to 25g and transverse straight portions 26a to 26d.

Lowermost longitudinal straight portions 25a to 25c are positioned near or adjacent each other. Similarly, uppermost longitudinal straight portions 25d to 25g are positioned near or adjacent each other. Transverse straight portions 26a and 26b located on the same sides of antenna 11 are also positioned near or substantially adjacent each other.

Transverse straight portions 26c are spaced away from straight portions 26a and 26b. Connecting wires 27 and 28 are bound together (not shown). Each coil 20 to 22 is wound in the same direction and antenna 11 and connecting wires 27 and 28 are formed from a single length of wire.

Referring to FIG. 6, a further embodiment of an antenna 29 is illustrated. Antenna 29 has two outer coils 30 and 31 and two inner coils 32 and 33 all being aligned in a common plane. Coils 30 to 33 give the impression of being diamond in shape and have corners 34 which are not at right angles.

Outer coil straight portions 35a and 35b are near or adjacent each other and are also parallel to each other. Similarly, inner coil straight portions 35c and 35d are near or adjacent each other and are also parallel to each other. However, there is a non-parallel relationship between outer coil straight portions 35a and 35b and inner coil straight portions 35c and 35d.

Each coil is wound in the same direction or shown by arrow 1. Antenna 29 and bound connecting wires 36 and 37 (the binding not shown) are formed from a single length of wire.

The antennas of FIGS. 4 to 6 are attached to a similar support member 12 as illustrated and described in FIGS. 2 and 3. However, channels 15 in support member 12 are configured differently to accommodate the different antenna shapes.

The antennas of FIGS. 4 to 6 are mounted at on acute angle x and aligned in a passageway as described in relation to FIGS. 1 to 3.

In use, and referring to any one of the above described antennas, support 12 provides protection to the antenna from damage due to animals passing thereby in the cattle run. Further, variations in the electrical characteristics of the antenna due to direct sunlight heating are reduced by support member 12 having thermal insulation properties.

The connecting wires are electrically connected to electronic circuitry including a transmitter and receiver. The transmitter is adapted to transmit an alternating frequency between 124.2 KHz to 139.4 KHz and ideally at approximately 134 KHz which is suitably the frequency to which the antenna is tuned (resonant frequency).

When antenna 1 is electrically connected to the electronic circuitry by the connecting wires, an alternating magnetic field is provided which energises a transponder located on or within an animal which is moving through the cattle run. The energised transponder then transmits a coded signal which is received by the antenna and then supplied to the receiver for decoding.

Surprisingly the antennas as described, when mounted at an acute angle x, reduce the problems associated with energising and receiving signals from transponders located on varying sizes of animals in which the transponder may be oriented in various positions. A further problem which is also reduced is that of energising and detecting transponders associated with quickly moving or bolting animals, this is partly due to an interrogation field being provided soley by the antenna thereby eliminating "nulled" or reduced field strengths that can be caused by opposing antenna systems.

Although the invention has been described with reference to preferred embodiments, it is to be understood that the invention is not limited to the specific embodiments herein described.

I claim:

1. An antenna arrangement comprising:
   (i) a passageway having one or more sides; and
   (ii) a single antenna for providing an interrogation field across said passageway
   wherein the antenna is located in a substantially vertical plane of one of said sides, said antenna including at least one coil having at least one corner and an adjacent straight portion which is oriented at an acute angle to a floor surface of the passageway, and
   wherein said interrogation field is provided solely by said antenna.

2. An antenna arrangement as claimed in claim 1, wherein the antenna includes a plurality of coils which are each positioned in the same vertical plane.

3. An antenna arrangement as claimed in claim 2, wherein the vertical plane is parallel to a longitudinal axis of the passageway.

4. An antenna arrangement as claimed in claim 2, wherein each of said coils has corners and straight portions.

5. An antenna arrangement as claimed in claim 2, wherein one or more of said coils is substantially parallelogram shaped.

6. An antenna arrangement as claimed in claim 2, wherein each of said coils has right angle corners and adjacent straight portions.

7. An antenna arrangement as claimed in claim 2, wherein the antenna comprises at least one inner coil and at least two outer coils.

8. An antenna arrangement as claimed in claim 2, wherein the antenna includes at least one inner coil and at least one outer coil and wherein at least one straight portion forming a side of the inner coil and a parallel straight portion forming a side of an outer coil are widely spaced relative to at least one other parallel side pair comprising a side of the inner coil and a side of the outer coil.

9. An antenna arrangement as claimed in claim 2, wherein the antenna includes at least one inner coil and two outer coils.

10. An antenna arrangement as claimed in claim 2, wherein the antenna includes at least one inner coil and at least two closely spaced outer coils.

11. An antenna arrangement as claimed in claim 2, wherein each said coil is wound in the same direction.

12. An antenna arrangement as claimed in claim 2, wherein each of said coils has corners and a majority of said corners are at a different distance from said floor surface.

13. An antenna arrangement as claimed in claim 2, wherein each of said coils has corners and all corners are at a different distance from said floor surface.

14. An antenna arrangement as claimed in claim 1, wherein the acute angle is between 15° and 60° to said floor surface.

15. An antenna arrangement as claimed in claim 1, wherein the acute angle is between 20° and 40° to said floor surface.

16. An antenna arrangement as claimed in claim 1, wherein the acute angle is substantially 30° to said floor surface.

17. An antenna arrangement comprising:
(i) a passageway having one or more sides; and
(ii) a single antenna for providing an interrogation field across said passageway;
wherein the antenna is located in a substantially vertical plane of one of said sides, said antenna including at least one coil having at least one corner and an adjacent straight portion oriented at an acute angle to a floor surface of the passageway, no substantial part of said at least one coil being horizontal or vertical; and
wherein said interrogation field is provided solely by said antenna.

18. An antenna arrangement comprising:
(i) a passageway having one or more sides; and
(ii) a single antenna for providing an interrogation field across said passageway;
wherein the antenna is located in a substantially vertical plane of one of said sides, said antenna including at least one quadrilateral coil with no substantial part of said coil being horizontal or vertical; and
wherein said interrogation field is provided solely by said antenna.

19. The antenna arrangement of claim 18 wherein said at least one quadrilateral coil has a first side oriented at an acute angle to the floor and an adjacent side oriented at an obtuse angle to the floor.

20. The antenna arrangement of claim 18 wherein said at least one quadrilateral coil is a parallelogram having a first side oriented at an acute angle to the floor and an adjacent side oriented at an obtuse angle to the floor.

21. The antenna arrangement of claim 18 wherein said at least one quadrilateral coil is a rectangle having a first side oriented at an acute angle to the floor.

22. An antenna arrangement comprising:
(i) a passageway having one or more sides; and
(ii) a single antenna for providing an interrogation field across said passageway;
wherein the antenna is located in a substantially vertical plane of one of said sides, said antenna including at least one quadrilateral inner coil and at least one quadrilateral outer coil with no substantial part of said inner coil or said outer coil being horizontal or vertical; and
wherein said interrogation field is provided solely by said antenna.

23. The antenna arrangement of claim 22 comprising two inner coils and two outer coils.

24. The antenna arrangement of claim 22 comprising two inner coils and two outer coils wherein said two inner coils have parallel sides and said two outer coils have parallel sides.

* * * * *